(12) United States Patent
Nomura et al.

(10) Patent No.: US 12,726,701 B2
(45) Date of Patent: Sep. 1, 2026

(54) IMAGE PROCESSING APPARATUS, IMAGE CAPTURE APPARATUS, AND IMAGE PROCESSING METHOD

(71) Applicant: CANON KABUSHIKI KAISHA, Tokyo (JP)

(72) Inventors: Naoki Nomura, Kanagawa (JP); Shimpei Itagaki, Tokyo (JP); Toru Matsumoto, Kanagawa (JP); Tamaki Negishi, Tokyo (JP); Mai Nakabayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 18/512,984

(22) Filed: Nov. 17, 2023

(65) Prior Publication Data

US 2024/0179408 A1 May 30, 2024

(30) Foreign Application Priority Data

Nov. 28, 2022 (JP) ................................ 2022-189532

(51) Int. Cl.

| | |
|---|---|
| ***H04N 23/67*** | (2023.01) |
| ***G06T 7/246*** | (2017.01) |
| ***H04N 5/262*** | (2006.01) |
| ***H04N 23/611*** | (2023.01) |
| ***H04N 23/62*** | (2023.01) |
| ***H04N 23/667*** | (2023.01) |
| ***H04N 23/68*** | (2023.01) |
| ***H04N 23/695*** | (2023.01) |

(52) U.S. Cl.

CPC .......... *H04N 23/675* (2023.01); *G06T 7/246* (2017.01); *H04N 5/2628* (2013.01); *H04N 23/611* (2023.01); *H04N 23/62* (2023.01); *H04N 23/667* (2023.01); *H04N 23/6811* (2023.01); *H04N 23/682* (2023.01); *H04N 23/695* (2023.01); *G06T 2207/20092* (2013.01); *G06T 2207/30201* (2013.01); *G06T 2207/30224* (2013.01)

(58) Field of Classification Search

CPC .......... G06T 7/246; G06T 2207/20092; G06T 2207/30224; G06T 2207/30201; H04N 5/2628; H04N 23/675; H04N 23/62; H04N 23/667; H04N 23/60; H04N 23/6811; H04N 23/611; H04N 23/682; H04N 23/695

USPC ........................................................ 348/208.1

See application file for complete search history.

(56) References Cited

U.S. PATENT DOCUMENTS

| | | | | |
|---|---|---|---|---|
| 9,648,229 | B2 * | 5/2017 | Kinoshita | H04N 23/631 |
| 10,218,996 | B2 * | 2/2019 | Haruna | G06T 7/246 |
| 10,880,457 | B2 * | 12/2020 | Uekusa | H04N 23/683 |

(Continued)

FOREIGN PATENT DOCUMENTS

| | | |
|---|---|---|
| JP | 2022-022767 A | 2/2022 |

*Primary Examiner* — Pritham D Prabhakher

(74) *Attorney, Agent, or Firm* — Cowan, Liebowitz & Latman, P.C.

(57) ABSTRACT

Disclosed is an image processing apparatus that detects one or more subject regions from an image. The image processing apparatus obtains a motion vector for each of the one or more subject regions and determines, as a main subject region, a subject region, among the one or more subject regions, for which a direction indicated by the motion vector is a prioritized direction of movement determined in advance.

18 Claims, 4 Drawing Sheets

(56) References Cited

U.S. PATENT DOCUMENTS

| | | | | |
|---|---|---|---|---|
| 11,070,729 | B2 * | 7/2021 | Midorikawa | H04N 23/67 |
| 11,265,478 | B2 * | 3/2022 | Tsubusaki | H04N 23/611 |
| 11,323,623 | B2 * | 5/2022 | Konishi | G06T 7/246 |
| 11,843,861 | B2 * | 12/2023 | Konishi | H04N 23/6811 |
| 2011/0037877 | A1 * | 2/2011 | Tamaru | H04N 23/958 382/254 |
| 2012/0050559 | A1 * | 3/2012 | Hasegawa | H04N 23/67 348/222.1 |
| 2015/0016683 | A1 * | 1/2015 | Kinoshita | G01S 3/7864 382/103 |
| 2018/0091762 | A1 * | 3/2018 | Miyakawa | H04N 23/73 |
| 2019/0045192 | A1 * | 2/2019 | Socek | H04N 19/573 |
| 2019/0327390 | A1 * | 10/2019 | Uekusa | H04N 5/144 |
| 2020/0036895 | A1 | 1/2020 | Midorikawa | |
| 2020/0186721 | A1 * | 6/2020 | Ogawa | G06V 10/24 |
| 2020/0228692 | A1 * | 7/2020 | Wakamatsu | H04N 23/695 |
| 2021/0195113 | A1 | 6/2021 | Tsubusaki | |
| 2021/0203850 | A1 * | 7/2021 | Konishi | G06T 5/73 |
| 2022/0256085 | A1 * | 8/2022 | Sugaya | H04N 23/687 |
| 2022/0417436 | A1 * | 12/2022 | Konishi | H04N 23/683 |

* cited by examiner

Figure 2:
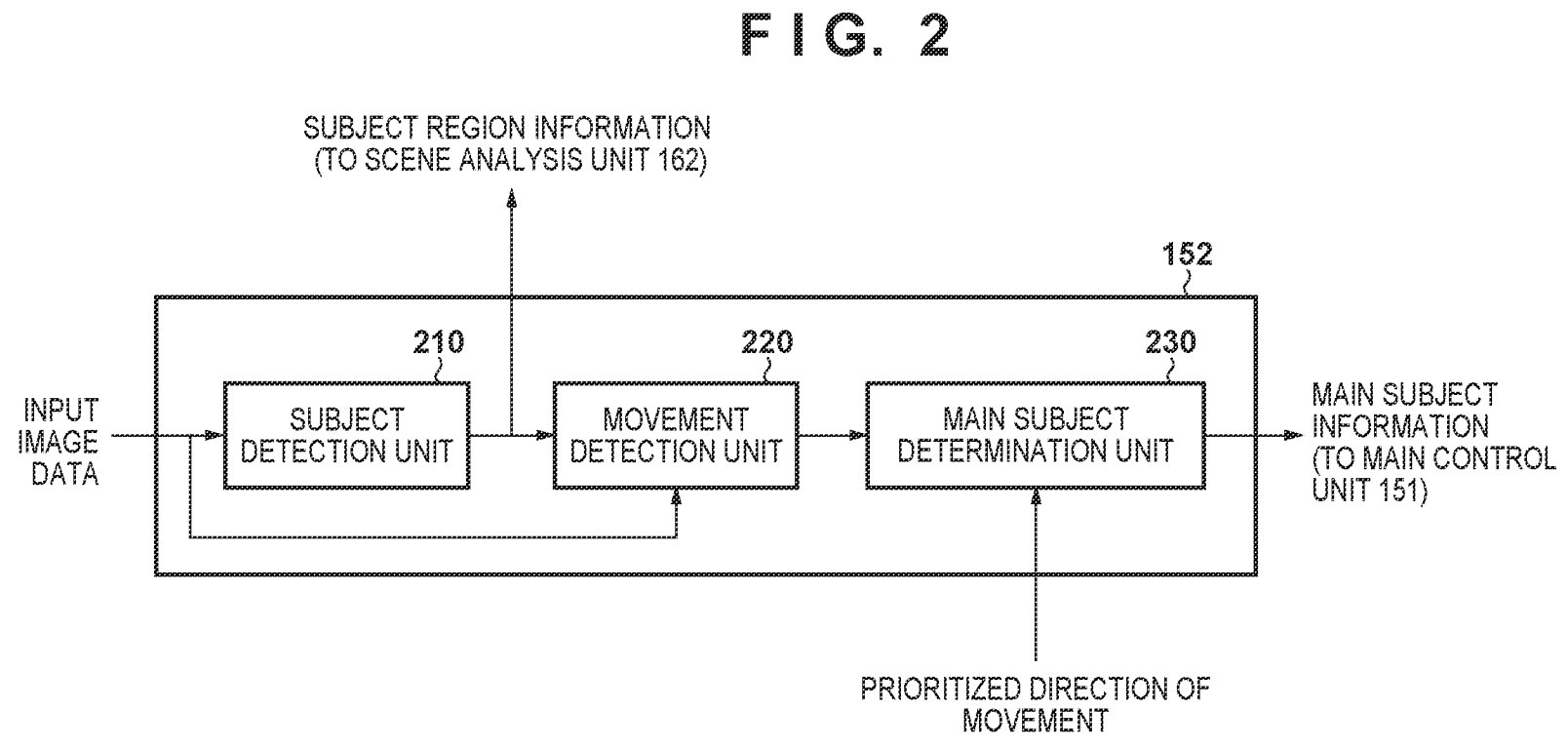

INPUT IMAGE DATA

210 SUBJECT DETECTION UNIT

220 MOVEMENT DETECTION UNIT

230 MAIN SUBJECT DETERMINATION UNIT

SUBJECT REGION INFORMATION (TO SCENE ANALYSIS UNIT 162)

PRIORITIZED DIRECTION OF MOVEMENT

MAIN SUBJECT INFORMATION (TO MAIN CONTROL UNIT 151)

F I G. 4A

F I G. 4B

IMAGE PROCESSING APPARATUS, IMAGE CAPTURE APPARATUS, AND IMAGE PROCESSING METHOD

BACKGROUND OF THE INVENTION

Field of the Invention

The present invention relates to an image processing apparatus, an image capture apparatus, and an image processing method.

Description of the Related Art

An image capture apparatus is known which controls an imaging optical system, processes captured images, and the like such that a detected main subject approaches the center of a field of view and is set to at least a given size. Such an image capture apparatus detects a region in which a specific subject, such as a person, appears (a subject region) from the captured image, and selects a main subject region from among the detected subject regions in accordance with a predetermined condition.

For example, in Japanese Patent Laid-Open No. 2022-22767, in a group motion scene in which a plurality of subject regions having the same motion pattern are present, the subject region located at the beginning of the direction of movement is taken as the main subject region.

However, in sports where many human subjects move in the same direction in response to the movement of a ball, such as soccer or basketball, the subject located at the front of a plurality of subjects moving in the same direction is not necessarily always the main subject. Accordingly, a range different from the range which the user wishes to see may be captured.

SUMMARY OF THE INVENTION

In light of such a problem with the conventional techniques, one aspect of the present invention provides an image processing apparatus and an image processing method capable of determining an appropriate subject as a main subject.

According to an aspect of the present invention, there is provided an image processing apparatus comprising one or more processors that execute a program stored in a memory and thereby function as: a subject detection unit configured to detect one or more subject regions from an image; a motion detection unit configured to obtain a motion vector for each of the one or more subject regions; and a determination unit configured to determine, as a main subject region, a subject region, among the one or more subject regions, for which a direction indicated by the motion vector is a prioritized direction of movement determined in advance.

According to an aspect of the present invention, there is provided an image processing method comprising: detecting one or more subject regions from an image; obtaining a motion vector for each of the one or more subject regions; and determining, as a main subject region, a subject region, among the one or more subject regions, for which a direction indicated by the motion vector is a prioritized direction of movement determined in advance.

According to an aspect of the present invention, there is provided a non-transitory computer-readable medium that stores a program executable by a computer, wherein the program, when executed by a computer, causes the computer to function as an image processing apparatus comprising: a subject detection unit configured to detect one or more subject regions from an image; a motion detection unit configured to obtain a motion vector for each of the one or more subject regions; and a determination unit configured to determine, as a main subject region, a subject region, among the one or more subject regions, for which a direction indicated by the motion vector is a prioritized direction of movement determined in advance.

According to an aspect of the present invention, there is provided an image capture apparatus comprising: an image capture unit; and one or more processors that execute a program stored in a memory and thereby function as an image processing apparatus using an image obtained by the image capture unit, wherein the image processing apparatus comprising: a subject detection unit configured to detect one or more subject regions from an image; a motion detection unit configured to obtain a motion vector for each of the one or more subject regions; and a determination unit configured to determine, as a main subject region, a subject region, among the one or more subject regions, for which a direction indicated by the motion vector is a prioritized direction of movement determined in advance, the image processing apparatus.

According to an aspect of the present invention, there is provided an image capture apparatus comprising: an image capture unit; and one or more processors that execute a program stored in a memory and thereby function as an image processing apparatus using an image obtained by the image capture unit, wherein the image processing apparatus comprising: a subject detection unit configured to detect one or more subject regions from an image; a motion detection unit configured to obtain a motion vector for each of the one or more subject regions; and a determination unit configured to determine, as a main subject region, a subject region, among the one or more subject regions, for which a direction indicated by the motion vector is a prioritized direction of movement determined in advance, wherein the prioritized direction of movement is determined based on a setting of a shooting mode for shooting a specific shooting scene.

According to an aspect of the present invention, there is provided an image capture apparatus comprising: an image capture unit; and one or more processors that execute a program stored in a memory and thereby function as an image processing apparatus using an image obtained by the image capture unit, wherein the image processing apparatus comprising: a subject detection unit configured to detect one or more subject regions from an image; a motion detection unit configured to obtain a motion vector for each of the one or more subject regions; a determination unit configured to determine, as a main subject region, a subject region, among the one or more subject regions, for which a direction indicated by the motion vector is a prioritized direction of movement determined in advance; and a control unit configured to control the image capture unit based on information about the main subject region.

According to an aspect of the present invention, there is provided a non-transitory computer-readable medium that stores a program executable by a computer, wherein the program, when executed by a computer equipped with an image capture apparatus having an image capture unit, causes the computer to function as an image processing apparatus using an image obtained by the image capture unit, comprising: a subject detection unit configured to detect one or more subject regions from an image; a motion detection unit configured to obtain a motion vector for each of the one or more subject regions; a determination unit configured to determine, as a main subject region, a subject region, among the one or more subject regions, for which a direction indicated by the motion vector is a prioritized direction of movement determined in advance; and a control unit configured to control the image capture unit based on information about the main subject region.

Further features of the present invention will become apparent from the following description of exemplary embodiments (with reference to the attached drawings).

BRIEF DESCRIPTION OF THE DRAWINGS

FIG. 2 is a block diagram schematically illustrating the steps of main subject determination processing according to the embodiment.

FIGS. 4A and 4B are schematic diagrams illustrating specific examples and effects of the embodiment.

DESCRIPTION OF THE EMBODIMENTS

Figure 1:
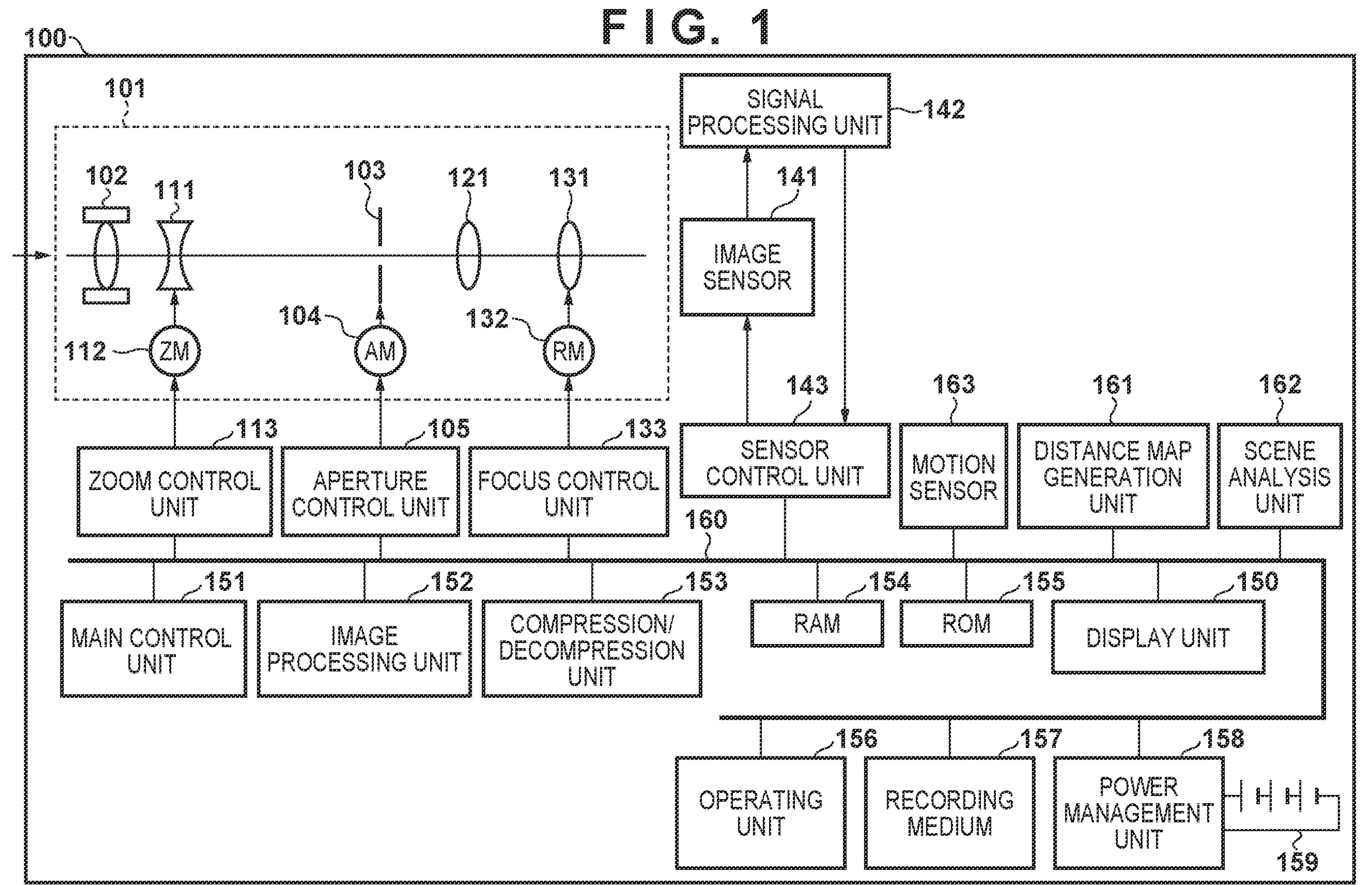
FIG. 1 is a block diagram illustrating an example of the functional configuration of a digital camera serving as an example of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment will describe a case where the present invention is applied in a digital camera serving as an example of an image processing apparatus. However, the present invention can be implemented in any electronic device capable of handling image data. Examples of such an electronic device include, in addition to image capture apparatuses, computer devices (personal computers, tablet computers, media players, PDAs, and the like), mobile phones, smartphones, game consoles, robots, drones, and dashboard cameras. These are merely examples, however, and the present invention can be applied in other electronic devices as well. Note that when implemented in a camera, the present invention can be implemented in a stationary camera which is not carried by a user, such as a surveillance camera, or in a wearable camera such as an action camera.

Configuration of Digital Camera

FIG. 1 is a block diagram illustrating an example of the functional configuration of a digital camera 100 serving as an example of an image processing apparatus according to an embodiment. The digital camera 100 is capable of shooting and recording moving images and still images. The function blocks in the digital camera 100 are communicatively connected to each other by a bus 160. Operations of the digital camera 100 are realized by one or more programmable processors provided in a main control unit 151 loading programs stored in a ROM 155 into a RAM 154 and executing the programs to control each function block. Unless otherwise specified, each function block can be realized by a hardware circuit such as an ASIC or the like, or by one or more programmable processors loading programs into memory and executing the programs.

A shooting lens 101 (a lens unit) includes a fixed 1-group lens 102, a zoom lens 111, an aperture stop 103, a fixed 3-group lens 121, a focus lens 131, a zoom motor (ZM) 112, an aperture motor (AM) 104, and a focus motor (FM) 132. The fixed 1-group lens 102, the zoom lens 111, the aperture stop 103, the fixed 3-group lens 121, and the focus lens 131 constitute an optical imaging system. Other lenses, such as lenses for image stabilization, may be included as well. Although the lenses 102, 111, 121, and 131 are illustrated as being single lenses for the sake of convenience, each lens may be constituted by a plurality of lenses. Additionally, the shooting lens 101 may be configured as an interchangeable lens which can be removed from the digital camera 100.

An aperture control unit 105 controls operations of the aperture motor 104 in accordance with commands from the main control unit 151, and changes the aperture diameter of the aperture stop 103.

A zoom control unit 113 controls operations of the zoom motor 112 in accordance with commands from the main control unit 151, and changes the focal length (field of view) of the shooting lens 101.

A focus control unit 133 calculates a defocus amount and a defocus direction of the shooting lens 101 based on a phase difference between a pair of focus detection signals obtained from an image sensor 141, for example. The focus control unit 133 then converts the defocus amount and the defocus direction into a driving amount and a driving direction of the focus motor 132. The focus control unit 133 controls the operations of the focus motor 132 based on the driving amount and the driving direction, and by driving the focus lens 131, controls the focus state of the shooting lens 101.

Although the focus control unit 133 performs automatic focus detection (AF) using the phase detection method in this manner, the focus control unit 133 may perform AF using the contrast detection method, which is based on contrast evaluation values of image signals obtained from the image sensor 141. Phase detection method AF using focus detection signals obtained from an AF sensor separate from the image sensor 141 may also be executed. Note that in the AF operations performed by the focus control unit 133, a focus detection region can be set to the region of the main subject detected by an image processing unit 152, which will be described later.

A subject image formed on an imaging plane of the image sensor 141 by the shooting lens 101 is converted into an electrical signal (an image signal) by photoelectric conversion elements provided in each of a plurality of pixels disposed in the image sensor 141.

The image sensor 141 may be a publicly-known CCD or CMOS color image sensor having, for example, a primary color Bayer array color filter. Furthermore, the image sensor 141 may be configured to be capable of moving the image capturing plane in a direction orthogonal to the optical axis and in a direction around the optical axis for the purpose of image stabilization. The image sensor 141 includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing a subject image formed on the image capturing plane is obtained.

In the present embodiment, m pixels in the horizontal direction and n pixels in the vertical direction (where n and m are plural numbers) are arranged in a matrix in the pixel array of the image sensor 141, and two photoelectric conversion elements (photoelectric conversion regions) are provided in each pixel. Signal readout from the image sensor 141 is controlled by a sensor control unit 143 in accordance with instructions from the main control unit 151.

The two photoelectric conversion regions in each pixel are called a region A and a region B, and an image constituted by a group of image signals read out from the regions A of the individual pixels will be called an "A image", whereas an image constituted by a group of image signals read out from the regions B of the individual pixels will be called a "B image". An image in which the A image and the B image are added on a pixel-by-pixel basis will be called an "A+B image". The A image and the B image form a parallax image pair. The A+B image is used for display and recording. In addition, the A image and the B image are used to generate focus detection signals used in phase detection method AF, generate distance maps, and the like.

The analog image signal read out from the image sensor 141 is supplied to a signal processing unit 142. The signal processing unit 142 applies signal processing such as noise reduction processing, A/D conversion processing, automatic gain control processing, and the like to the image signal, and outputs the result to the sensor control unit 143 as image data. The sensor control unit 143 stores the image data received from the signal processing unit 142 in the random access memory (RAM) 154.

When recording the image data stored in the RAM 154, the main control unit 151 generates a data file according to a recording format by adding a predetermined header, for example, to the image data. At this time, the main control unit 151 encodes the image data using a compression/decompression unit 153 as necessary, and stores the encoded data in the data file. The main control unit 151 records the generated data file into a recording medium 157 such as a memory card, for example.

When displaying the image data stored in the RAM 154, the main control unit 151 uses the image processing unit 152 to scale the image data to conform to a display size of a display unit 150, and then writes the image data into a region of the RAM 154 used as a video memory (a VRAM region). The display unit 150 reads out the display image data from the VRAM region of the RAM 154 and displays the data in a display device such as an LCD or an organic EL display. The display unit 150 also displays a result of detecting of the main subject (a moving object) detected by the image processing unit 152 (a frame indicating the main subject region, for example).

The digital camera 100 causes the display unit 150 to function as an electronic viewfinder (EVF) by immediately displaying a shot moving image in the display unit 150 when shooting the moving image (when in a shooting standby state, when recording a moving image, or the like). The moving image and the frame images thereof displayed when the display unit 150 is caused to function as an EVF are called a "live view image" or a "through-the-lens image". Additionally, when shooting a still image, the digital camera 100 displays the still image shot immediately before in the display unit 150 for a set period of time such that a user can confirm the result of the shot. These display operations are also implemented under the control of the main control unit 151.

The compression/decompression unit 153 encodes and decodes image data. For example, when recording a still image, a moving image, or the like, the image data, audio data, or the like is encoded using a predetermined encoding method. Meanwhile, when playing back a still image data file, a moving image data file, or the like recorded in the recording medium 157, the compression/decompression unit 153 decodes the encoded data and stores the resulting data in the RAM 154.

The RAM 154 is used as a system memory, a video memory, a buffer memory, and the like for executing programs.

The ROM 155 stores programs that can be executed by the processor of the main control unit 151, various setting values, unique information of the digital camera 100, GUI data, and the like. The ROM 155 may be electrically rewriteable.

The present embodiment assumes that a prioritized direction of movement is associated with each of types of shooting scenes and registered in the ROM 155 in advance, for example.

For example, in a basketball scene, the vertical direction is registered as the prioritized direction of movement. This is because in a basketball scene, players who shoot or players who jump or crouch slightly (before jumping) in the vicinity of the basket are regarded as the main subject, and images focusing on players who shoot or defend in the vicinity of the basket are recorded or played back. The same applies for games similar to basketball, such as handball.

In addition, in track and field games such as the high jump, the long jump, and hurdles, the prioritized direction of movement can be taken as a diagonal upward direction. This is not limited to sports, and applies to other scenes as well, where the prioritized direction of movement is determined based on the posture and the like of a subject of interest.

Furthermore, when the direction of movement is not a simple direction, a subject moving in the prioritized direction of movement may be actually shot to learn the prioritized direction of movement.

"Operating unit 156" is a collective name for input devices (buttons, switches, dials, and the like) provided for a user to input various types of instructions to the digital camera 100. The input devices constituting the operating unit 156 are named according to the functions assigned thereto. For example, the operating unit 156 includes a release switch, a moving image recording switch, a shooting mode selection dial for selecting a shooting mode, a menu button, a directional key, an OK key, and the like. The present embodiment assumes that a shooting mode for shooting a specific scene can be selected using the shooting mode selection dial.

The release switch is a switch for recording a still image, and the main control unit 151 recognizes the release switch being in a half-pressed state as a shooting preparation instruction, and the release switch being in a fully-pressed state as a shooting start instruction. Additionally, the main control unit 151 recognizes the moving image recording switch being pressed while in the shooting standby state as a moving image recording start instruction, and recognizes the moving image recording switch being pressed while recording a moving image as a recording stop instruction. Note that the functions assigned to the same input device may be variable. Additionally, the input devices may include software buttons or keys which use a touchscreen. Additionally, the operating unit 156 may include an input device that corresponds to a non-contact input method, such as voice input, gaze input, or the like. Additionally, the operating unit 156 may include a receiver that accepts instructions from an external device such as a remote controller.

The main control unit 151 includes one or more programmable processors such as a CPU, an MPU, or the like, and controls each unit by loading programs stored in the ROM 155 into the RAM 154 and executing the programs to implement the functions of the digital camera 100. The main control unit 151 also executes AE processing, which automatically determines exposure conditions (shutter speed or accumulation time, aperture value, and sensitivity) based on information on the subject luminance. The information on the subject luminance can be obtained from the image processing unit 152, for example. The main control unit 151 can also determine the exposure conditions based on luminance information from a specific subject region, such as a person's face, for example.

When shooting a moving image, the main control unit 151 fixes the aperture stop 103 and controls the exposure using an electronic shutter speed (accumulation time) and gain level. The main control unit 151 notifies the sensor control unit 143 of the determined accumulation time and gain level. The sensor control unit 143 controls the operations of the image sensor 141 such that shooting is performed in accordance with the exposure conditions included in the notification.

A distance map generation unit 161 generates a distance map using, for example, the image data stored in the RAM 154. The distance map is information indicating a distribution of distances from the digital camera 100 to an object present in a shooting range (subject distances). The distance map may be, for example, in the form of a two-dimensional image in which luminance values represent subject distances, and may also be called a "depth map distance image", a "depth image", or the like. The distance map can be generated by a publicly-known method. For example, the distance map generation unit 161 can obtain a defocus amount (the amount and direction of shift from an in-focus position of the focus lens) at each pixel position from an image shift amount in the parallax image (the aforementioned A image and B image). The defocus amount represents the shift amount of the focus based on the current subject distance, and the defocus amount can therefore be handled as distance information. Of course, the in-focus position of the focus lens may be obtained based on the defocus amount, and the subject distance corresponding to the in-focus position may then be obtained. Note that the digital camera 100 may be a multi-eye camera, such as a stereo camera, to obtain the parallax image, or the parallax image may be obtained from a storage medium, an external device, or the like.

The distance map can also be generated without using a parallax image. By obtaining a focus lens position where a contrast evaluation value is maximum on a pixel-by-pixel basis, the subject distance can be obtained on a pixel-by-pixel basis. The distance information can also be found on a pixel-by-pixel basis based on a correlation relationship between a defocus amount and a distance, from image data obtained by shooting the same scene multiple times while changing the focal distance and a point spread function (PSF) of the optical system. The distance map generation unit 161 may generate a distance map for the entire image, or may generate a distance map for only a partial region of the image that is necessary for moving object detection. The distance map generation unit 161 saves the generated distance map in the RAM 154. The distance map is referred to by the image processing unit 152.

Furthermore, the distance map generation unit 161 can calculate a confidence level for each region in the distance map, and save the confidence level along with the distance map. The method for calculating the confidence level is not particularly limited. For example, when generating the distance map using parallax images, to find the image shift amount between the parallax images, a correlation amount (similarity degree), such as SAD, is calculated while changing the relative shift amount, and the shift amount where the correlation is highest (the correlation amount is lowest) is detected as the image shift amount. The confidence level of the detected image shift amount (defocus amount) is considered to be higher as the difference between the average value and the maximum value of the calculated correlation amount increases. The difference between the average value and the maximum value of the correlation amount calculated at each pixel position can therefore be used as the confidence level at that pixel position. Note that the distance map generation unit 161 may generate a distance map by obtaining a small region (pixel block) instead of finding a subject distance, a confidence level thereof, and the like on a pixel-by-pixel basis.

A scene analysis unit 162 identifies the type of the shooting scene based on information about the subject region detected by the image processing unit 152 (e.g., one or more of the size, position, and movement). The distance map generated by the distance map generation unit 161 may be used by the scene analysis unit 162 to identify the type of the shooting scene. For example, it is assumed that information about the subject region which should be satisfied and/or characteristics of the distance map are registered in advance for each type of shooting scene to be identified. The scene analysis unit 162 may also identify the shooting scene using a pre-trained neural network prepared for each type of shooting scene. The scene analysis unit 162 notifies the main control unit 151 of the type of shooting scene identified.

A motion sensor 163 generates a signal based on motion of the digital camera 100. The motion sensor 163 may be a combination of an accelerometer that outputs a signal based on motion along each of X, Y, and Z axes, and a gyrosensor that outputs a signal based on motion about each of those axes, for example. Optical image stabilization can be realized by moving a correction lens and/or the image sensor 141 so as to cancel out the movement of the digital camera 100 expressed by the signals output by the motion sensor 163. Alternatively, electronic image stabilization can be realized by cropping the image so as to cancel out the movement of the digital camera 100.

The image processing unit 152 generates signals and image data for different purposes, obtains and/or generates various types of information, and so on by applying predetermined image processing to the image data stored in the RAM 154. The image processing unit 152 outputs the obtained or generated information, data, and the like to the main control unit 151, the RAM 154, or the like, according to the purpose of use.

The image processing applied by the image processing unit 152 can include preprocessing, color interpolation processing, correction processing, detection processing, data processing, evaluation value calculation processing, special effect processing, and so on, for example.

The preprocessing includes signal amplification, reference level adjustment, defective pixel correction, and the like.

The color interpolation processing is performed when the image sensor is provided with a color filter, and interpolates the values of color components that are not included in the individual pixel data constituting the image data. Color interpolation processing is also called "demosaicing".

The correction processing can include white balance adjustment, tone adjustment, correction of image degradation caused by optical aberrations in the shooting lens 101 (image restoration), correction of the effects of vignetting in the shooting lens 101, color correction, and the like.

The detection processing includes detecting a region in which a specific subject appears (e.g., a face region and a body region of a person or an animal, a vehicle (a two-wheeled vehicle or a four-wheeled vehicle), an aircraft, sports equipment and implements (balls, rackets, nets, goals, or the like)), detecting movement of such a subject, processing for recognizing a person, and the like.

The data processing can include cutting out a region (cropping), compositing, scaling, and the like. Note that instead of the main control unit 151, the image processing unit 152 may generate display image data, recording image data, and the like as the data processing.

The evaluation value calculation processing can include processing such as generating signals, evaluation values, and the like used in automatic focus detection (AF), generating evaluation values used in automatic exposure control (AE), and the like.

The special effect processing includes adding bokeh effects, changing color tones, relighting processing, and the like.

Note that these are examples of processing that can be applied by the image processing unit 152 and are not intended to limit the processing applied by the image processing unit 152.

The information about the detected subject region may be used in other image processing (e.g., white balance adjustment processing, processing for generating luminance information of the subject, and the like). When the focus control unit 133 performs AF using the contrast detection method, a contrast evaluation value can be generated by the image processing unit 152 and supplied to the focus control unit 133. The image processing unit 152 stores the processed image data, information about the subject region, and the like in the RAM 154.

FIG. 2 is a block diagram schematically illustrating processing performed by the image processing unit 152 in processing for determining the main subject. The blocks in FIG. 2 correspond to the main processing steps executed by the image processing unit 152 when determining the main subject.

The image processing unit 152 applies processing for determining the main subject to the input image data. The input image data is moving image data, and may be generated in parallel with the image captured by the image sensor 141, or may be read out from the recording medium 157. Note that the image processing unit 152 may reduce the resolution of the input image data, change to a grayscale image, and so on before input to a subject detection unit 210, in order to reduce the processing load.

The subject detection unit 210 detects a region, in the image expressed by the input image data, in which a specific subject appears (a subject region). The subject region can be detected using any publicly-known method, such as template matching, machine learning, or the like, and thus detailed descriptions thereof will be omitted.

The type of the subject for which the subject detection unit 210 detects the subject region may be fixed, or may be changed in accordance with a set shooting mode, for example. Basically, it is assumed that the region of a human subject (a face region, a pupil region, a torso region, or the like) is always detected. Note that the detection of the subject region may be executed for each frame of moving image data, or may be executed for each of a predetermined plurality of frames.

For each type of subject, the subject detection unit 210 outputs a total number of detected subject regions, as well as a position, a size, a detection confidence level, and the like of the individual subject regions, to a movement detection unit 220 as a detection result. The subject detection unit 210 also outputs the detection result to the scene analysis unit 162.

The movement detection unit 220 obtains a motion vector for each subject region based on the detection result for the subject region. The motion vector can be obtained using any publicly-known method, such as, for example, using the subject region as a template and searching for the region having the highest correlation with the template within the input image data. Note that the motion vector indicates the direction of movement of the subject region within the screen, and thus motion vectors of the subject region having the same movement direction and movement amount within the screen are the same whether the image is shot in a horizontal orientation or a vertical orientation.

Note that the movement detection unit 220 can update the template using the subject region detection result for each of a predetermined plurality of frames. The movement detection unit 220 outputs information about the motion vector obtained for each subject region to a main subject determination unit 230.

The main subject determination unit 230 determines the main subject region from among the detected subject regions based on the motion vectors obtained by the movement detection unit 220 and a prioritized direction of movement provided by the main control unit 151. The main subject determination unit 230 outputs information (at least a position and a size) about the determined main subject region to the main control unit 151.

The prioritized direction of movement is obtained by the main control unit 151 from the ROM 155 and supplied to the image processing unit 152, for example, based on the type of the shooting scene identified by the scene analysis unit 162, or the type of the shooting scene that can be specified from the set shooting mode.

The main subject determination unit 230 determines, as the main subject region, a subject region having a motion vector, among the motion vectors obtained by the movement detection unit 220, for which the direction is the same as the prioritized direction of movement (or for which the difference between the directions is less than a threshold). The main subject region may be determined a plurality of times. Note that if a plurality of subject regions having a motion vector in which the direction is the same as the prioritized direction of movement (or the difference between the directions is less than a threshold) are present, the main subject region may be determined taking into account a positional relationship with other types of subject regions. For example, if a ball subject, a goal subject, or the like is detected, a person subject region that is closest in distance to the ball subject, the goal subject, or the like, or for which the distance is less than a threshold, may be determined as the main subject region.

Note that if a subject region is detected for a plurality of types of subjects, the main subject determination unit 230 can determine the main subject region from subject regions for a specific type of subject (e.g., a human) set in advance in accordance with, for example, the type of the shooting scene.

The main control unit 151 can use the main subject information obtained from the image processing unit 152 for various types of processing.

For example, if a moving image is being shot, the main control unit 151 can (i) set a focus detection region in the main subject region, and (ii) change the field of view of the shooting lens 101 so as to enlarge (zoom in on) the main subject region. Alternatively, the field of view of the shooting lens 101 can be changed such that the entirety of the subject region falls within the field of view (zoom out), and/or change the shooting direction such that the main subject region approaches the center of the shooting range.

Note that if a plurality of main subject regions are present, the main control unit 151 can execute these controls by treating the smallest region that includes all the main subject regions as a single main subject region.

The shooting direction can be changed by changing the direction of the optical axis of the lens unit 101, as long as the lens barrel of the lens unit 101 can be rotated in the pan direction and the tilt direction. If the lens barrel of the lens unit 101 is fixed, the shooting direction can be changed by driving (moving) the configuration for image stabilization (the correction lens and/or the image sensor). In this case, the main control unit 151 can change the shooting direction by executing image stabilization while treating the motion vector of the main subject region as the movement of the digital camera 100.

Note that if the digital camera 100 is not stationary or fixed, the shooting direction can be changed by obtaining an image stabilization amount (a driving amount of the image stabilization mechanism) in consideration of movement of the digital camera 100 itself obtained from the motion sensor 163. For example, if the shooting direction is to be changed to the left, the stabilization amount is reduced if the digital camera 100 is moving to the left, whereas the stabilization amount is increased if the digital camera 100 is moving to the right.

In addition, if a moving image is being played back, the main control unit 151 can control the image processing unit 152 to (i) apply processing for reducing the sharpness or luminance of a region other than the main subject region or a peripheral region of the main subject region; (ii) enlarge the main subject region, or change the crop area of the image such that the entirety of the subject region falls within the field of view, and/or (iii) change the crop position of the image such that the position of the main subject region approaches the center of the image.

Note that scaling may be applied by the image processing unit 152 such that the resolution of the cropped image matches the display resolution.

The main control unit 151 may track a main subject region that has been determined until at least a predetermined amount of time has elapsed, in order to prevent a drop in the quality of the moving image caused by the main subject region being present/absent, switching, or the like. Alternatively, if the main subject region changes from being present to being absent, the main control unit 151 may gradually expand the field of view of the lens unit 101 so as to suppress a sudden change in the field of view.

The processing for determining the main subject is particularly useful when the digital camera 100 is mounted on a user's head, a tripod, or the like and shoots images automatically, as opposed to situations where the digital camera 100 is held by the user to shoot images. Whether or not to enable the processing for determining the main subject can be set by the user operating the menu screen, for example.

Figure 3:
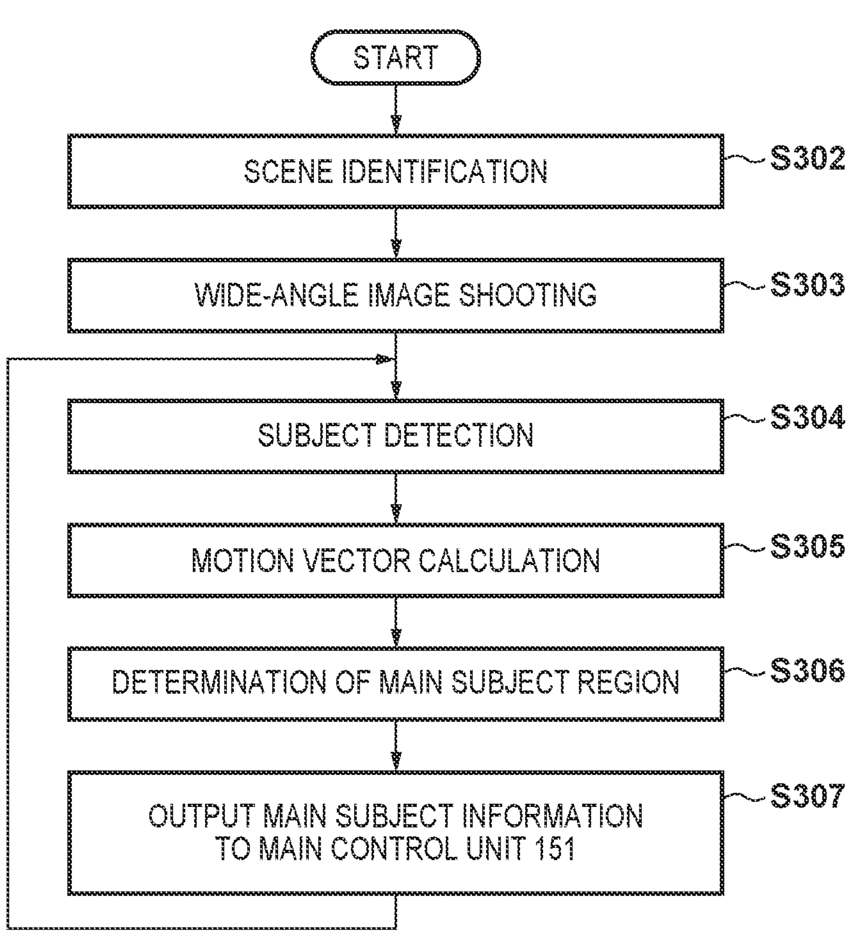
FIG. 3 is a flowchart pertaining to image capturing operations according to the embodiment.

Moving image capturing operations using the main subject determination processing described above will be described next with reference to the flowchart in FIG. 3. This section assumes a moving image for recording is being shot, as opposed to a moving image for live view display.

For example, when an instruction to start recording a moving image is input from a remote controller, the main control unit 151 controls the respective units to execute operations for recording a moving image. This starts the shooting of a moving image, and the generation and recording of moving image data for recording. Aside from the processing pertaining to the main subject determination, the same processing as used conventionally may be executed here, and thus the following will focus on the processing pertaining to the main subject determination.

When the shooting of a moving image starts, in step S302, the scene analysis unit 162 also starts scene identification processing. Note that if the shooting scene can be specified from the settings for the digital camera 100, such as the shooting mode, the scene analysis unit 162 need not execute the scene identification. When the scene being shot can be specified, the main control unit 151 refers to the ROM 155 and obtains the prioritized direction of movement stored in association with the specified shooting scene. The main control unit 151 supplies the prioritized direction of movement to the image processing unit 152 (the main subject determination unit 230), and then executes step S303.

In step S303, the main control unit 151 confirms the field of view (the focal length) of the lens unit 101, and adjusts the field of view such that the shooting range is the widest, for example. Note that the maximum field of view does not necessarily have to be set, and the focal length of the shooting lens 101 may be adjusted to any desired focal length that is less than a threshold if the focal length is greater than or equal to a predetermined threshold. The reason for widening the field of view is so that more subject regions can be detected.

In step S304, the image processing unit 152 (the subject detection unit 210) detects subject regions within the shot frame image.

In step S305, the image processing unit 152 (the movement detection unit 220) obtains a motion vector for each of the detected subject regions.

In step S306, the image processing unit 152 (the main subject determination unit 230) determines, as the main subject region, a subject region having a motion vector for which the direction is the same as the prioritized direction of movement or for which the difference between the directions is less than a threshold.

In step S307, the image processing unit 152 (the main subject determination unit 230) outputs main subject information to the main control unit 151, regardless of whether or not a determined main subject region is present.

The above processing is for one frame of the moving image, and thus the processing from step S304 is executed continuously thereafter as well. Note that when the field of view of the shooting lens 101 is adjusted in accordance with the main subject information, the subject region is detected within the range of the adjusted field of view. When the state shifts from one in which the main subject region is detected to one in which the main subject region is not detected, the main control unit 151 widens the field of view of the lens unit 101, and thus the range in which the subject region is detected becomes wider even if step S303 is not executed.

Effects of the present invention will be described with reference to FIGS. 4A and 4B.

Figures 4A, 4B:
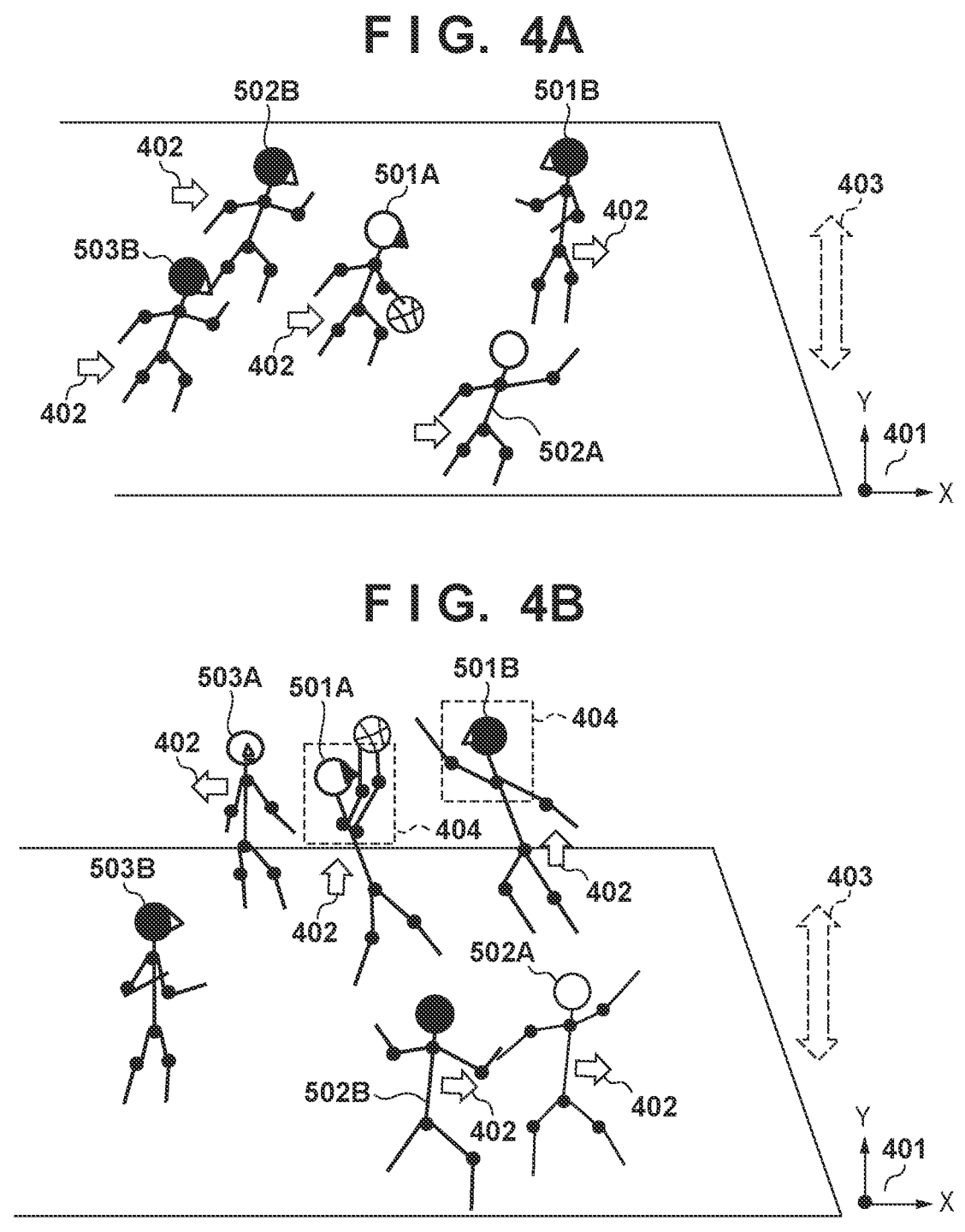

FIGS. 4A and 4B illustrate, as schematic diagrams, a part of a sports image shot by the camera.

FIGS. 4A and 4B schematically illustrate an example of a basketball scene. Here, it is assumed that the scene illustrated in FIG. 4A has changed into the scene illustrated in FIG. 4B.

In FIGS. 4A and 4B, 501A and 502A indicate players on team A, and 501B, 502B, and 503B indicate players on team B. Motion vectors obtained for the regions of the players are schematically indicated by 402. 403 schematically indicates the prioritized direction of movement for the basketball scene (the vertical direction). The x axis represents the horizontal direction, and the y axis represents the vertical direction.

In the scene illustrated in FIG. 4A, all the players are moving to the right. In this case, with the method proposed in Japanese Patent Laid-Open No. 2022-22767, the player 501B present at the start of the direction of movement is recognized as the main subject. For example, when control for zooming in on the main subject is executed, even if the player 501B is zoomed in on, the image will be one in which the intent of zooming in on that player is unclear. With the main subject determination processing of the present embodiment, the main subject region is not determined in a scene such as that illustrated in FIG. 4A, and thus the entire scene is shot, which makes it possible to record a more appropriate image than one in which the player 501B is zoomed in on.

FIG. 4B illustrates the player 501A in a shooting position and the player 501B in a position to block the shot, and both are in the process of jumping. In this case, the motion vectors for the regions of the players 501A and 501B are upward. As a result, the regions of the players 501A and 501B are determined as main subject regions. 404 is a mark indicating a subject region determined as the main subject. The main control unit 151 may superimpose and display the mark 404 on the live view image based on the main subject information.

Note that the user may be capable of selecting the prioritized direction of movement from, for example, predetermined directions. If the user has selected the prioritized direction of movement, it is not necessary to identify the scene. In addition, the prioritized direction of movement may be determined dynamically in accordance with, for example, a ratio or a difference between the number of motion vectors in the vertical direction and the number of motion vectors in the horizontal direction, among the motion vectors obtained by the movement detection unit 220. For example, the direction indicated by the motion vectors for which the ratio or the number is lower can be taken as the prioritized direction of movement.

According to the present embodiment as described above, a subject region, among subject regions detected in an image, that is moving in a prioritized direction of movement determined in advance, is determined as the main subject region. Accordingly, the main subject region can be appropriately determined by setting a characteristic direction of movement in the shot scene as the prioritized direction of movement. The processing for determining the main subject according to the present embodiment is particularly useful when a user takes shots without operating the digital camera, such as automatic shooting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-189532, filed Nov. 28, 2022, which is hereby incorporated by reference herein in its entirety.

What is claimed is:

1. An image processing apparatus comprising one or more processors that execute a program stored in a memory and thereby function as:

a subject detection unit configured to detect one or more subject regions from an image;

a motion detection unit configured to obtain a motion vector for each of the one or more subject regions;

an identification unit configured to identify a scene of the image; and a determination unit configured to determine, as a main subject region, a subject region, among the one or more subject regions, for which a direction indicated by the motion vector is a prioritized direction of movement that is determined based on the identified scene.

2. The image processing apparatus according to claim 1, wherein the prioritized direction of movement is determined based on a setting made by a user.

3. The image processing apparatus according to claim 1, wherein the prioritized direction of movement is determined based on a total number of motion vectors indicating a first direction and a total number of motion vectors indicating a second direction.

4. The image processing apparatus according to claim 1, wherein the one or more processors further function as an image processing unit configured to process the image using information about the main subject region, and the image processing unit reduces a sharpness or a luminance of a region in the image that is not the main subject region.

5. The image processing apparatus according to claim 1, wherein the one or more processors further function as an image processing unit configured to process the image using information about the main subject region, and the image processing unit changes a crop area of the image such that the main subject region appears as enlarged in the cropped area.

6. The image processing apparatus according to claim 1, wherein the one or more processors further function as an image processing unit configured to process the image using information about the main subject region, and the image processing unit changes a crop area of the image such that the main subject region is closer to a center of the cropped area.

7. An image processing method comprising:

detecting one or more subject regions from an image;

obtaining a motion vector for each of the one or more subject regions identifying a scene of the image; and determining, as a main subject region, a subject region, among the one or more subject regions, for which a direction indicated by the motion vector is a prioritized direction of movement that is determined based on the identified scene.

8. A non-transitory computer-readable medium that stores a program executable by a computer, wherein the program, when executed by a computer, causes the computer to function as an image processing apparatus comprising:

a subject detection unit configured to detect one or more subject regions from an image;

a motion detection unit configured to obtain a motion vector for each of the one or more subject regions;

an identification unit configured to identify a scene of the image; and a determination unit configured to determine, as a main subject region, a subject region, among the one or more subject regions, for which a direction indicated by the motion vector is a prioritized direction of movement that is determined based on the identified scene.

9. An image capture apparatus comprising:

an image capture unit; and one or more processors that execute a program stored in a memory and thereby function as an image processing apparatus using an image obtained by the image capture unit, wherein the image processing apparatus comprising:

a subject detection unit configured to detect one or more subject regions from an image;

a motion detection unit configured to obtain a motion vector for each of the one or more subject regions;

an identification unit configured to identify a scene of the image; and a determination unit configured to determine, as a main subject region, a subject region, among the one or more subject regions, for which a direction indicated by the motion vector is a prioritized direction of movement that is determined based on the identified scene.

10. An image capture apparatus comprising:

an image capture unit; and one or more processors that execute a program stored in a memory and thereby function as an image processing apparatus using an image obtained by the image capture unit, wherein the image processing apparatus comprising:

a subject detection unit configured to detect one or more subject regions from an image;

a motion detection unit configured to obtain a motion vector for each of the one or more subject regions; and a determination unit configured to determine, as a main subject region, a subject region, among the one or more subject regions, for which a direction indicated by the motion vector is a prioritized direction of movement, wherein the prioritized direction of movement is determined based on a setting of a shooting mode for shooting a specific shooting scene.

11. An image capture apparatus comprising:

an image capture unit; and one or more processors that execute a program stored in a memory and thereby function as an image processing apparatus using an image obtained by the image capture unit, wherein the image processing apparatus comprising:

a subject detection unit configured to detect one or more subject regions from an image;

a motion detection unit configured to obtain a motion vector for each of the one or more subject regions;

an identification unit configured to identify a scene of the image;

a determination unit configured to determine, as a main subject region, a subject region, among the one or more subject regions, for which a direction indicated by the motion vector is a prioritized direction of movement that is determined based on the identified scene; and a control unit configured to control the image capture unit based on information about the main subject region.

12. The image capture apparatus according to claim 11, wherein the control unit sets a focus detection region in the main subject region.

13. The image capture apparatus according to claim 11, wherein the control unit changes a field of view of the image capture unit so as to enlarge the main subject region.

14. The image capture apparatus according to claim 11, wherein the control unit changes a shooting direction of the image capture unit such that the main subject region approaches a center of a shooting range.

15. The image capture apparatus according to claim 14, wherein the control unit changes the shooting direction by changing a direction of an optical axis of the image capture unit.

16. The image capture apparatus according to claim 14, wherein the control unit changes the shooting direction by driving an image stabilization mechanism included in the image capture unit.

17. The image capture apparatus according to claim 16, wherein the control unit determines a driving amount of the image stabilization mechanism in consideration of movement of the image capture apparatus.

18. A non-transitory computer-readable medium that stores a program executable by a computer, wherein the program, when executed by a computer equipped with an image capture apparatus having an image capture unit, causes the computer to function as an image processing apparatus using an image obtained by the image capture unit, comprising:

a subject detection unit configured to detect one or more subject regions from an image;

a motion detection unit configured to obtain a motion vector for each of the one or more subject regions;

an identification unit configured to identify a scene of the image;

a determination unit configured to determine, as a main subject region, a subject region, among the one or more subject regions, for which a direction indicated by the motion vector is a prioritized direction of movement that is determined based on the identified scene; and a control unit configured to control the image capture unit based on information about the main subject region.

* * * * *